(12) United States Patent
Suto (10) Patent No.: US 8,329,326 B2
(45) Date of Patent: Dec. 11, 2012

(54) ELECTROCHEMICAL DEVICE

(75) Inventor: Daisuke Suto, Tokyo (JP)

(73) Assignee: TDK Corporation, Tokyo (JP)

( * ) Notice: Subject to any disclaimer, the term of this patent is extended or adjusted under 35 U.S.C. 154(b) by 842 days.

(21) Appl. No.: 12/397,649

(22) Filed: Mar. 4, 2009

(65) Prior Publication Data
US 2009/0277784 A1 Nov. 12, 2009

(30) Foreign Application Priority Data

Mar. 11, 2008 (JP) ................. P2008-061549

(51) Int. Cl.
*H01M 2/00* (2006.01)
*H01M 6/42* (2006.01)

(52) U.S. Cl. .......... 429/65; 429/149; 429/156; 429/158; 429/160; 429/161; 429/162; 429/178

(58) Field of Classification Search ........................ None
See application file for complete search history.

(56) References Cited

U.S. PATENT DOCUMENTS

| | | | |
|---|---|---|---|
| 6,335,110 B1 * | 1/2002 | Chang et al. ...................... | 429/7 |
| 7,198,866 B2 | 4/2007 | Miyamoto et al. | |
| 2004/0009334 A1 | 1/2004 | Miyamoto et al. | |
| 2005/0123828 A1 * | 6/2005 | Oogami et al. ............... | 429/152 |
| 2006/0110658 A1 * | 5/2006 | Zhu et al. ....................... | 429/208 |
| 2006/0234558 A1 * | 10/2006 | Li .................................. | 439/627 |
| 2007/0117020 A1 * | 5/2007 | Baker et al. .................... | 429/234 |
| 2008/0076019 A1 * | 3/2008 | Wu ................................. | 429/161 |

FOREIGN PATENT DOCUMENTS

| | | |
|---|---|---|
| JP | A-11-167930 | 6/1999 |
| JP | A-2004-47167 | 2/2004 |

OTHER PUBLICATIONS

Translation of Chinese Office Action mailed Dec. 31, 2010 issued in Chinese Patent Application No. 200910118180.2.

* cited by examiner

*Primary Examiner* — Cynthia Lee
(74) *Attorney, Agent, or Firm* — Oliff & Berridge, PLC (57) ABSTRACT

An electrochemical device 1A has first and second electrode pads 5a and 5b on the upper surfaces 11 of protrusions 3a and 3b, and has first and second electrode pads 7a and 7b on the lower surfaces 13 of the protrusions 3a and 3b. First and second foil electrode terminals $26_1a$ and $26_1b$ of an electrochemical element $25_1$ are electrically connected to the first and second electrode pads 5a and 5b, respectively. First and second foil electrode terminals $26_2a$ and $26_2b$ of an electrochemical element $25_2$ are electrically connected to the first and second electrode pads 7a and 7b, respectively.

3 Claims, 7 Drawing Sheets

ELECTROCHEMICAL DEVICE

BACKGROUND OF THE INVENTION

1. Field of the Invention

The present invention relates to an electrochemical device including a plurality of laminated electrochemical elements.

2. Related Background Art

Laminated cells and electric double-layer capacitor are known examples of conventional laminate type electrochemical elements. JP 11-167930A, for example, discloses a laminated cell. Laminated cells have cell elements with a stacked structure, laminate sheets (film-shaped packages) for enclosing the cell elements, and tab terminals (electrode terminals) protruding from the cell elements to the outside of the laminate sheets in order to allow the cell elements to be electrically connected to the outside.

However, the tab terminals of laminated cells are usually composed of a thin metal such as aluminum foil. Such foil tab terminals are readily deformable, and a resulting advantage is that strain associated with thermal expansion and shrinkage of cells can be absorbed. However, since the tab terminals are foil, they lack mechanical strength and are difficult to connect to each other in series or in parallel, and the tab terminals are readily broken off, among other problems, which complicates their application to assembled batteries, etc.

SUMMARY OF THE INVENTION

In view of such problems, an object of the present invention is to provide an electrochemical device in which laminated electrochemical elements are easier to stack, while reinforcing the mechanical strength of the electrode terminals of laminated electrochemical elements.

To solve the above problems, the electrochemical device pertaining to the present invention includes an insulating plate-shaped substrate having first and second electrode pads on each of both sides, and laminated electrochemical elements that are fixed, respectively, to either side of the plate-shaped substrate and that have first and second foil electrode terminals, where the first electrode terminals are electrically connected to the first electrode pads, and the second electrode terminals are electrically connected to the second electrode pads.

In the electrochemical device of the invention, the laminated electrochemical elements having the first and second foil electrode terminals are fixed to both sides of the insulating plate-shaped substrate which has the first and second electrode pads on each of both sides. The foil electrode terminals can absorb thermal expansion and contraction of the electrochemical elements, thus preventing wires from becoming broken between the electrode terminals and electrode pads as a result of such causes. This structure allows the two laminated electrochemical elements to be kept separate from each other, with the plate-shaped substrate therebetween, while unifying the two laminated electrochemical elements with the insulating plate-shaped substrate, and can thereby prevent unintended shorts between the two laminated electrochemical elements.

Also, the first electrode terminals are electrically connected to the first electrode pads, and the second electrode terminals are electrically connected to the second electrode pads. The use of a structure in which first and second foil electrode terminals are supported by first and second electrode pads on both sides of the plate-shaped substrate can make it easier to integrate laminated electrochemical elements while reinforcing the mechanical strength of the first and second electrode terminals of the electrochemical elements fixed to both sides of the plate-shaped substrate.

Additionally, the first electrode pad on one side of the plate-shaped substrate faces one of the first and second electrode pads on the other side of the plate-shaped substrate, the second electrode pad on the one side of the plate-shaped substrate faces the other of the first and second electrode pads on the other side of the plate-shaped substrate, the plate-shaped substrate has a through-hole passing through at least one set of pairs of the electrode pads with the plate-shaped substrate interposed therebetween, the plate-shaped substrate is provided with a through-hole passing through the two electrode pads facing each other with the plate-shaped substrate interposed therebetween, and a conductive member is disposed in the at least one through-hole.

The use of such a structure will allow the two electrode pads facing each other on either side of the plate-shaped substrate to be electrically connected to each other. This will also enable easier serial or parallel connection of two electrochemical elements having two electrode terminals electrically connected to two electrode pads on the one and other sides of the plate-shaped substrate.

The conductive member is preferably a rivet, plated metal layer, or soldering material. This will allow the conductive member to be easily disposed in the plate-shaped substrate through-hole, and will allow the two electrode pads facing each other to be electrically connected to each other by the conductive member.

The present invention allows laminated electrochemical elements to be easily integrated while reinforcing the mechanical strength of the electrode terminals of laminated electrochemical elements.

DESCRIPTION OF THE PREFERRED EMBODIMENTS

Preferred embodiments of the electrochemical device according to the present invention will be described below with reference to the attached drawings. Elements that are the same or equivalent in the description of the figures will be indicated by the same symbol, and will not be re-explained.

First Embodiment

Figure 1:
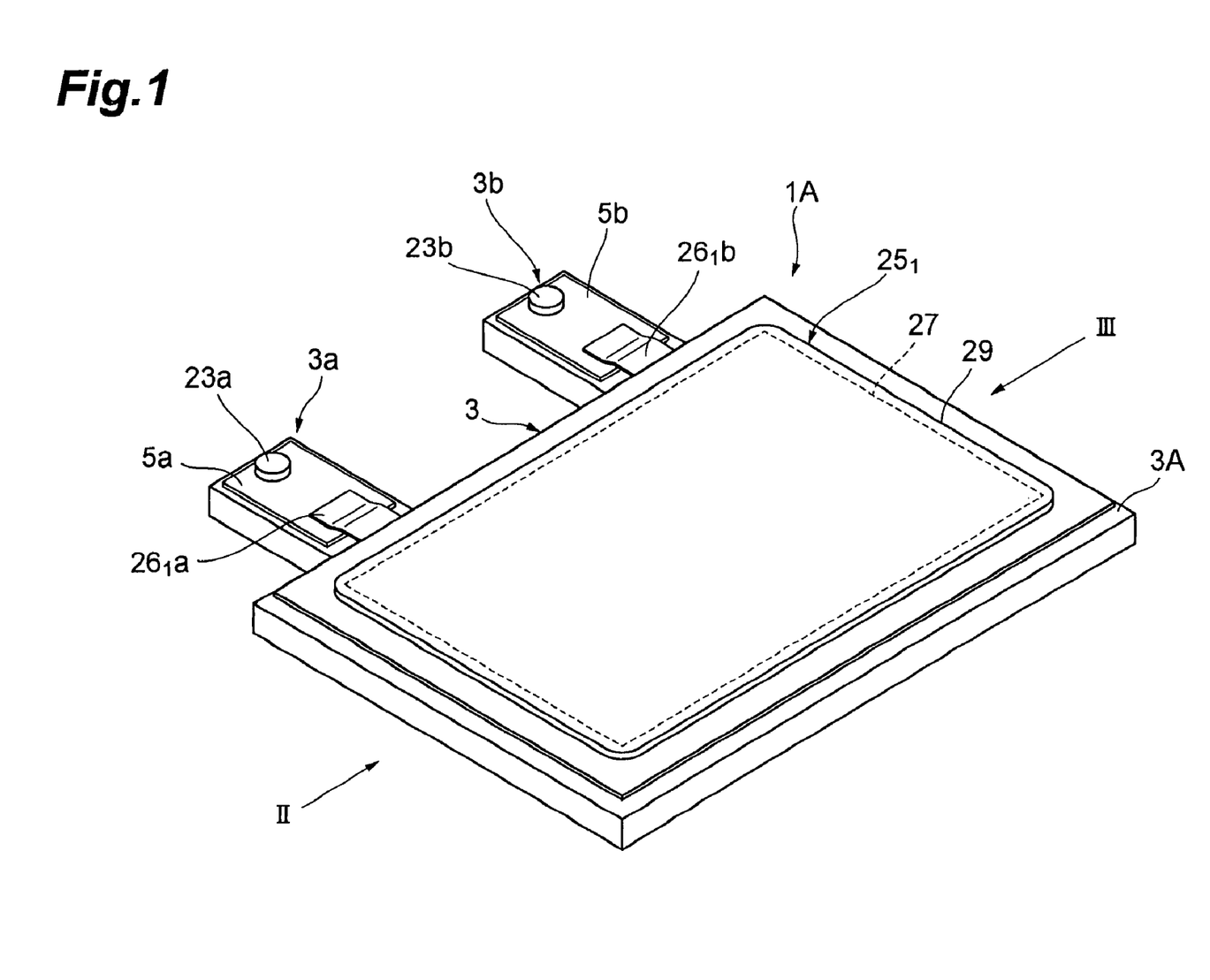
FIG. 1 is a perspective view of an electrochemical device 1A in a first embodiment.
Figure 2:
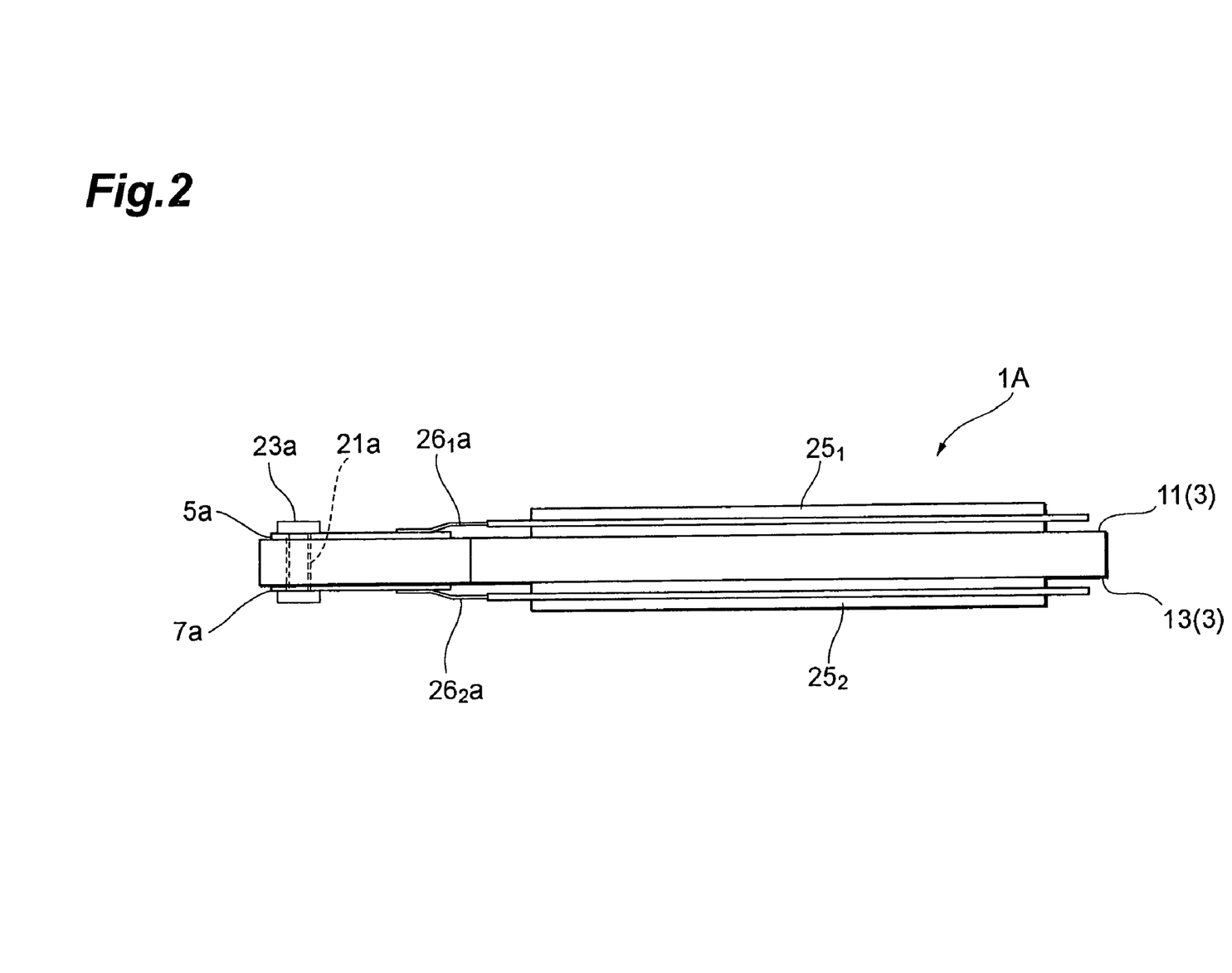
FIG. 2 is a side view of the electrochemical device 1A as viewed in the direction of arrow II in FIG. 1.
Figure 3:
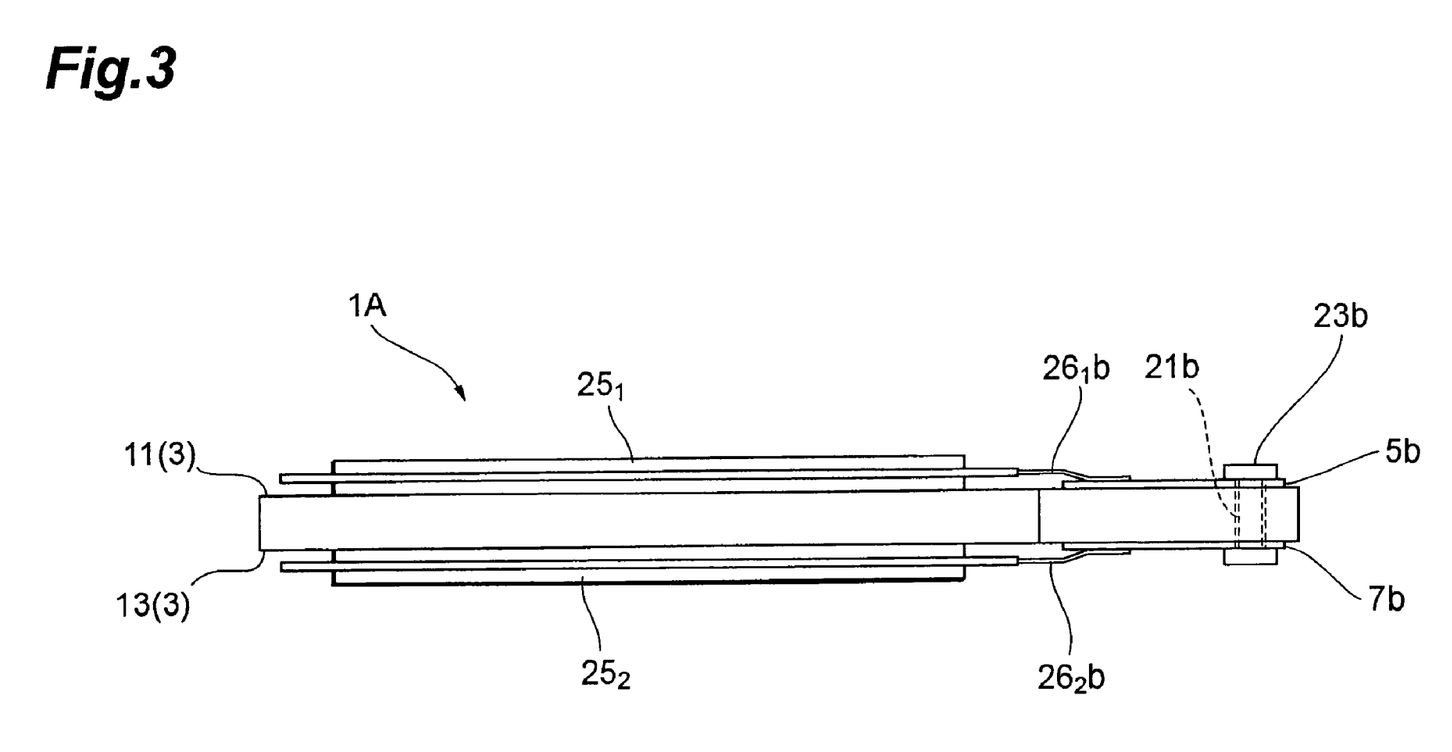
FIG. 3 is a side view of the electrochemical device 1A as viewed in the direction of arrow III in FIG. 1.

FIG. 1 is a perspective view of an electrochemical device 1A in a first embodiment. FIG. 2 is a side view of the electrochemical device 1A as viewed in the direction of arrow II in FIG. 1, and FIG. 3 is a side view of the electrochemical device 1A as viewed in the direction of arrow III in FIG. 1. As shown in FIGS. 1 through 3, the electrochemical device 1A in the first embodiment is equipped with a retaining substrate (late-shaped substrate) 3, and laminated electrochemical elements $25_1$ and $25_2$ fixed to either side 11 and 13 of the retaining substrate 3.

The retaining substrate 3 is an insulating thin plate (such as a printed board), and has a flat upper surface 11 and lower surface 13. The retaining substrate 3 is composed of a rectangular fixing component 3A and rectangular protrusions 3a and 3b extending from one end of the fixing component 3A. The protrusions 3a and 3b are separate from each other, and the direction in which the protrusions 3a and 3b extend is parallel.

On the upper surface 11 of the retaining substrate 3, the protrusion 3a is provided with an electrode pad 5a (first electrode pad), and the protrusion 3b is provided with an electrode pad 5b (second electrode pad). On the lower surface 13 of the retaining substrate 3, the protrusion 3a is provided with an electrode pad 7a (first electrode pad), and the protrusion 3b is provided with an electrode pad 7b (second electrode pad). In this way, the electrode pad 5a faces the electrode pad 7a, and the electrode pad 5b faces the electrode pad 7b, with the retaining substrate 3 therebetween. The electrode pads 5a, 5b, 7a, and 7b are composed of copper, but may also be composed of another metal such as aluminum.

The protrusion 3a of the retaining substrate 3 is provided with a through-hole 21a passing through the electrode pad 5a on the upper surface 11 and the electrode pad 7a on the lower surface 13. The through-hole 21a is provided with a conductive member (rivet) 23a for fixing the electrode pad 5a, protrusion 3a of the retaining substrate 3, and the electrode pad 7a together, and the conductive member 23a electrically connects the electrode pad 5a and electrode pad 7a.

The protrusion 3b of the retaining substrate 3 is provided with a through-hole 21b passing through the electrode pad 5b on the upper surface 11 and the electrode pad 7b on the lower surface 13. The through-hole 21b is provided with a conductive member (rivet) 23b for fixing the electrode pad 5b, protrusion 3b of the retaining substrate 3, and the electrode pad 7b together, and the conductive member 23b electrically connects the electrode pad 5b and electrode pad 7b.

The electrode pads 5a and 7a will preferably extend near to the end (leading end) of the protrusion 3a, and the electrode pads 5b and 7b will preferably extend near to the end (leading end) of the protrusion 3b. The shortest distance from the leading end of each to the electrode pads is shorter than the shortest distance from the leading end of each to the locations where the electrode terminals are connected, and no electrode terminals are located toward the leading end of each electrode pad. When the protrusions 3a and 3b of the electrochemical device 1A are used as male connectors, they can be inserted into receiving female connectors, allowing the electrode pads 5a, 5b, 7a, and 7b and electrode terminals $26_1a$, $26_1b$, $26_2a$, and $26_2b$ to be easily connected electrically to the receiving female connectors (102: see FIG. 4).

The laminated electrochemical elements $25_1$ and $25_2$ are to rectangular, thin plate-shaped lithium ion secondary cells. The electrochemical elements $25_x$ (where x=1 and 2) have an element 27 and an enclosing film (film-shaped package) 29 enclosing the element 27. The element 27 is substantially tabular, and has at least a negative electrode, a positive electrode, and a separator provided therebetween. The plate thickness of the electrochemical elements $25_x$ (x=1 and 2) is about 5 mm each, for example. The electrochemical element $25_1$ is fixed to the upper surface 11 of the fixing component 3A, and the electrochemical element $25_2$ is fixed to the lower surface 13 of the fixing component 3A.

The negative electrode terminal $26_1a$ (first electrode terminal) is connected to the negative electrode of the electrochemical element $25_1$, and the positive electrode terminal $26_1b$ (second electrode terminal) is connected to the positive electrode of the electrochemical element $25_1$. One end of each of the negative electrode terminal $26_1a$ and positive electrode terminal $26_1b$ is exposed on one side of the enclosing film 29, and the tab type electrode terminals $26_1a$ and $26_1b$ are connected loosely, with no tension between the two ends, to the electrode pads 5a and 5b. The negative electrode terminal $26_1a$ and positive electrode terminal $26_1b$ are made of aluminum in the form of foil, referred to as tab terminals.

The negative electrode terminal $26_1a$ is fixed to the electrode pad 5a by a method such as spot welding, ultrasonic welding, or adhesion with a conductive adhesive, and is electrically connected to the electrode pad 5a. The positive electrode terminal $26_1b$ is fixed with a conductive adhesive to the electrode pad 5b and is electrically connected to the electrode pad 5b.

One end each of the tab negative electrode terminal $26_1a$ and positive electrode terminal $26_1b$ protruding on one side of the enclosing film 29 will preferably extend up to about the center of the electrode pad 5a and electrode pad 5b. This will allow the negative electrode terminal $26_1a$ and positive electrode terminal $26_1b$ to be connected to the receiving female connectors without the negative electrode terminal $26_1a$ and positive electrode terminal $26_1b$ coming into contact with the receiving female connectors as described above when the protrusion 3a and 3b portions of the electrochemical device 1A are used as male connectors.

The negative electrode terminal $26_2a$ (first electrode terminal) is connected to the negative electrode of the electrochemical element $25_2$, and the positive electrode terminal $26_2b$ (second electrode terminal) is connected to the positive electrode of the electrochemical element $25_2$. One end of each of the negative electrode terminal $26_2a$ and positive electrode terminal $26_2b$ is exposed on one side of the enclosing film 29, and the tab type electrode terminals $26_2a$ and $26_2b$ are connected loosely, with no tension between the two ends, to the electrode pads 7a and ft. The negative electrode terminal $26_2a$ and positive electrode terminal $26_2b$ are made of aluminum, copper, or nickel in the form of foil, referred to as tab terminals.

The negative electrode terminal $26_2a$ is fixed with a conductive adhesive to the electrode pad 7a and is electrically connected to the electrode pad 7a. The positive electrode terminal $26_2b$ is fixed with a conductive adhesive to the electrode pad 7b and is electrically connected to the electrode pad 7b. The electrochemical element $25_1$ and the electrochemical element $25_2$ are thus connected in parallel.

One end each of the tab negative electrode terminal $26_2a$ and positive electrode terminal $26_2b$ protruding on one side of the enclosing film 29 will preferably extend up to about the center of the electrode pad 7a and electrode pad 7b. This will allow the negative electrode terminal $26_2a$ and positive electrode terminal $26_2b$ to be connected to the receiving female connectors without the negative electrode terminal $26_2a$ and positive electrode terminal $26_2b$ coming into contact with the receiving female connectors when the protrusion 3a and 3b portions of the electrochemical device 1A are used as male connectors.

In the electrochemical device 1A in this embodiment, the main surfaces of the laminated electrochemical elements $25_1$ and $25_2$ are fixed, respectively, to either side of the retaining substrate 3. The retaining substrate 3 is also insulating. This allows the two laminated electrochemical elements $25_1$ and $25_2$ to be kept separate from each other, with the retaining substrate 3 therebetween, while unifying the two laminated electrochemical elements $25_1$ and $25_2$ with the retaining substrate 3, and can thereby prevent unintended shorts between the electrochemical element $25_1$ and electrochemical element $25_2$.

The negative electrode terminal $26_1a$ and positive electrode terminal $26_1b$ of the electrochemical element $25_1$ are fixed and electrically connected to the electrode pads 5a and 5b, respectively, and the negative electrode terminal $26_2a$ and positive electrode terminal $26_2b$ of the electrochemical element $25_2$ are fixed and electrically connected to the electrode pads 7b and 7a, respectively. The use of such a structure in which the foil electrode terminals (negative and positive electrode terminals) of the electrochemical elements $25_1$ and $25_2$ are supported by the electrode pads can reinforce the mechanical strength of the foil electrode terminals $26_1a$, $26_1b$, $26_2a$, and $26_2b$. The electrode terminals $26_1a$, $26_1b$, $26_2a$, and $26_2b$ are also in the form of foil and are therefore better for addressing thermal expansion and contraction. That is, these electrode terminals are prevented from becoming detached or the like as a result of the inherent thermal expansion and contraction of the electrochemical elements or the retaining substrate 3 between the electrode pads 5a, 5b, 7a, and 7b and the electrochemical elements themselves.

The electrode pads 5a and 7a face each other, with the retaining substrate 3 therebetween, and are electrically connected by the conductive member 23a, but the negative electrode terminal $26_1a$ and negative electrode terminal $26_2a$ are electrically connected to the electrode pads 5a and 7a, respectively. The electrode pads 5b and 7b face each other, with the retaining substrate 3 therebetween, and are electrically connected by the conductive member 23b, but the positive electrode terminal $26_1b$ and positive electrode terminal $26_2b$ are electrically connected to the electrode pads 5b and 7b, respectively. The use of such a structure allows the electrochemical elements $25_1$ and $25_2$ to be readily connected in parallel.

Figure 4:
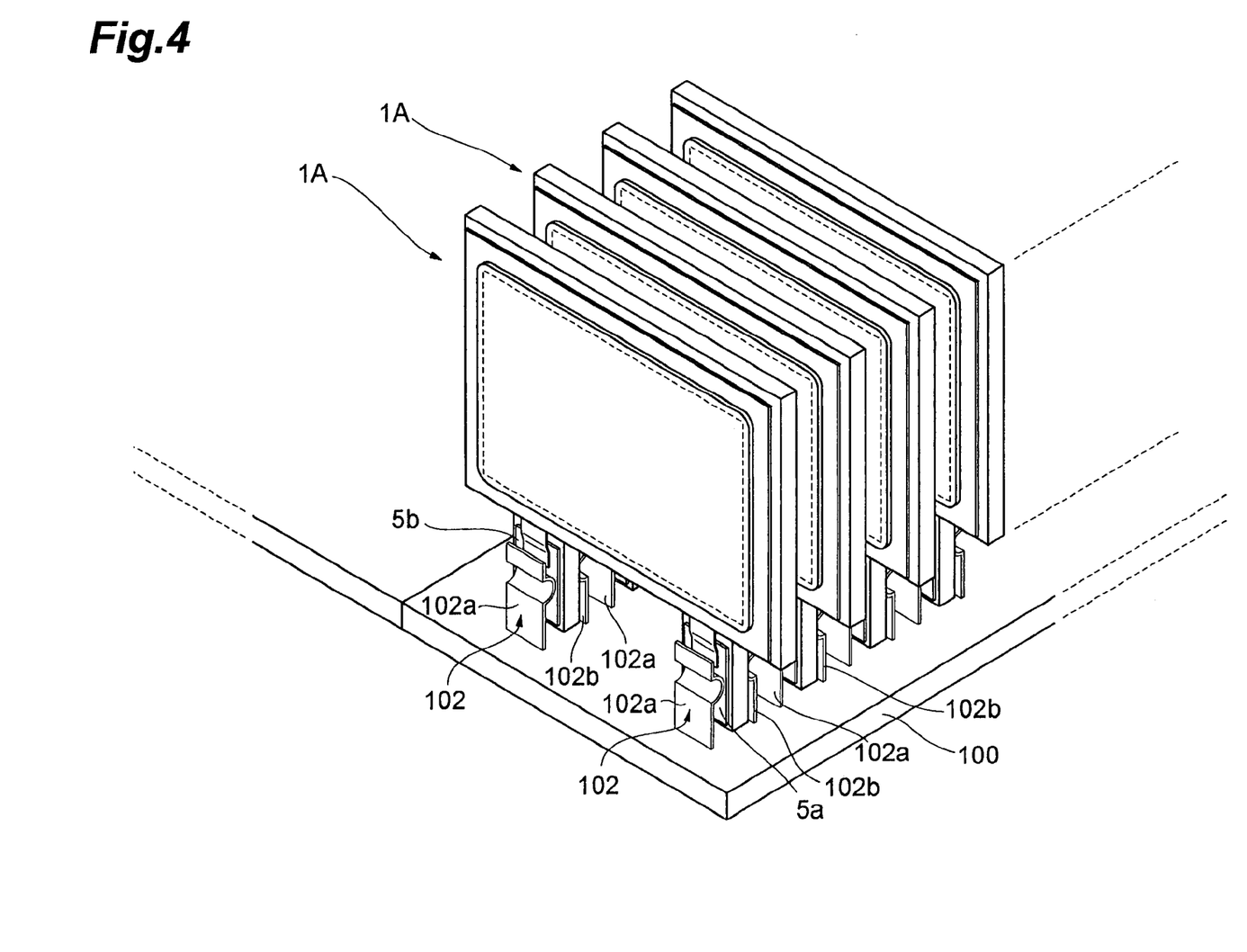
FIG. 4 illustrates an example of a specific method for using the electrochemical device 1A.

FIG. 4 illustrates an example of a specific method for using the electrochemical device 1A. As shown in FIG. 4, a plurality of receiving female connectors 102 that project vertically relative to a substrate 100 are arranged in parallel on the substrate 100 in an object (such as electrical machinery or vehicle, etc.) equipped with the electrochemical device 1A. One female connector 102 is composed of a pair of metal components 102a and 102b consisting of conductive springs; when a plate-shaped substrate is inserted between the metal components 102a and 102b, the plate-shaped member is held while inwardly urged by the pair of metal components 102a and 102b, and the metal components 102a and 102b are connected to the electrode pads.

The protrusions 3a and 3b of each electrochemical device 1A are thus inserted into the respective receiving female connectors 102. This allows a plurality of electrochemical devices 1A to be vertically stacked in the direction in which the receiving female connectors 102 project upward. This allows the electrochemical devices 1A to be integrated while making efficient use of space. The plurality of stacked electrochemical devices 1A can also be connected in series to obtain high voltage.

Second Embodiment

Figure 5:
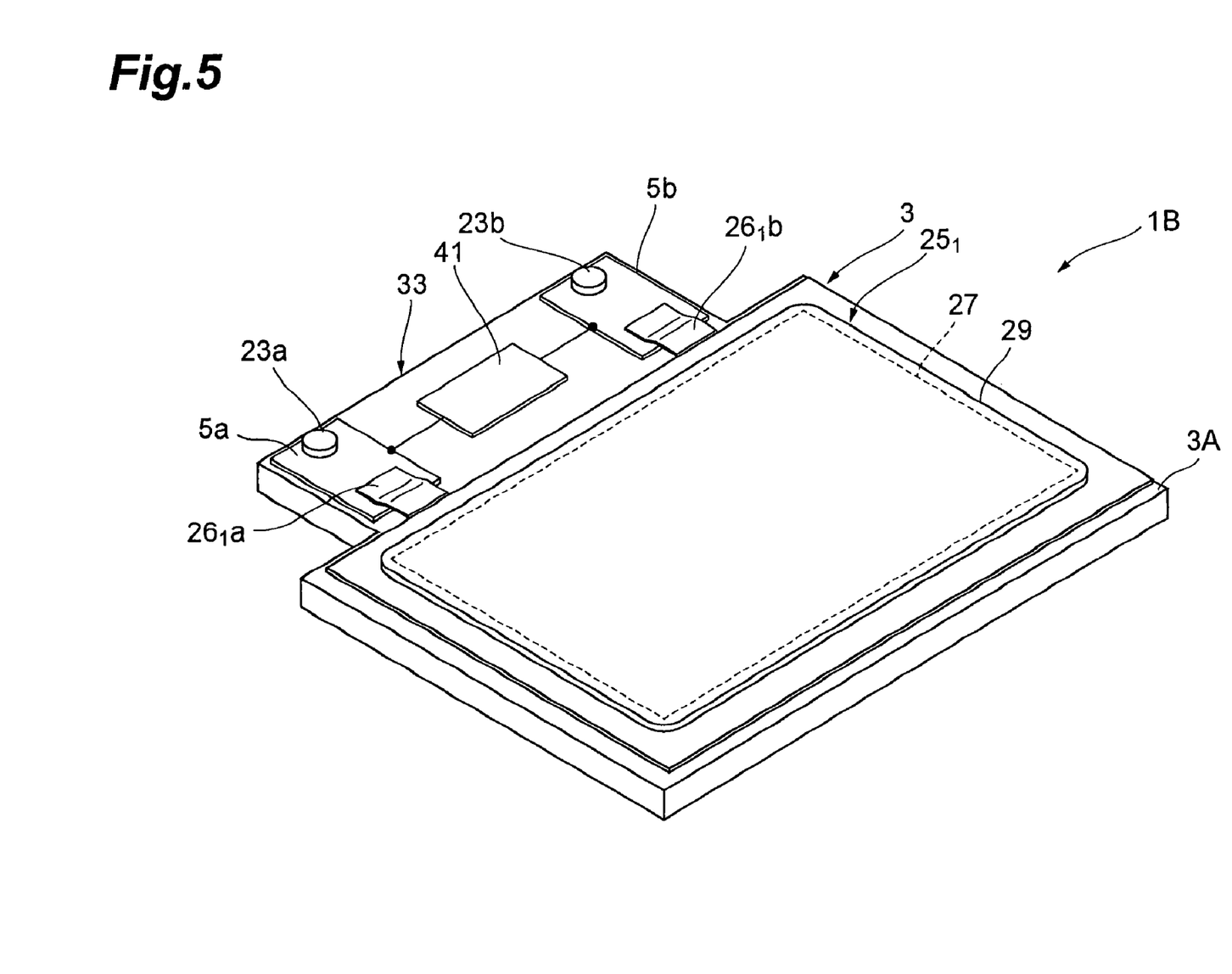
FIG. 5 is a perspective view of an electrochemical device 1B in a second embodiment of the invention.

FIG. 5 is a perspective view of an electrochemical device 13 in a second embodiment. As shown in FIG. 5, the differences between the electrochemical device 1B in the second embodiment and the electrochemical device 1A in the first embodiment are that one protrusion 33 having electrode pads 5a and 5b and electrode pads 7a and 7b on the upper surface 11 and lower surface 13, respectively is provided instead of two separately provided protrusions 3a and 3b, and a terminal circuit 41 is also provided between the electrode pad 5a and electrode pad 5b. As the structure is otherwise the same as the structure of the electrochemical device 1A, the same symbols are used and will not be further elaborated.

Figure 6:
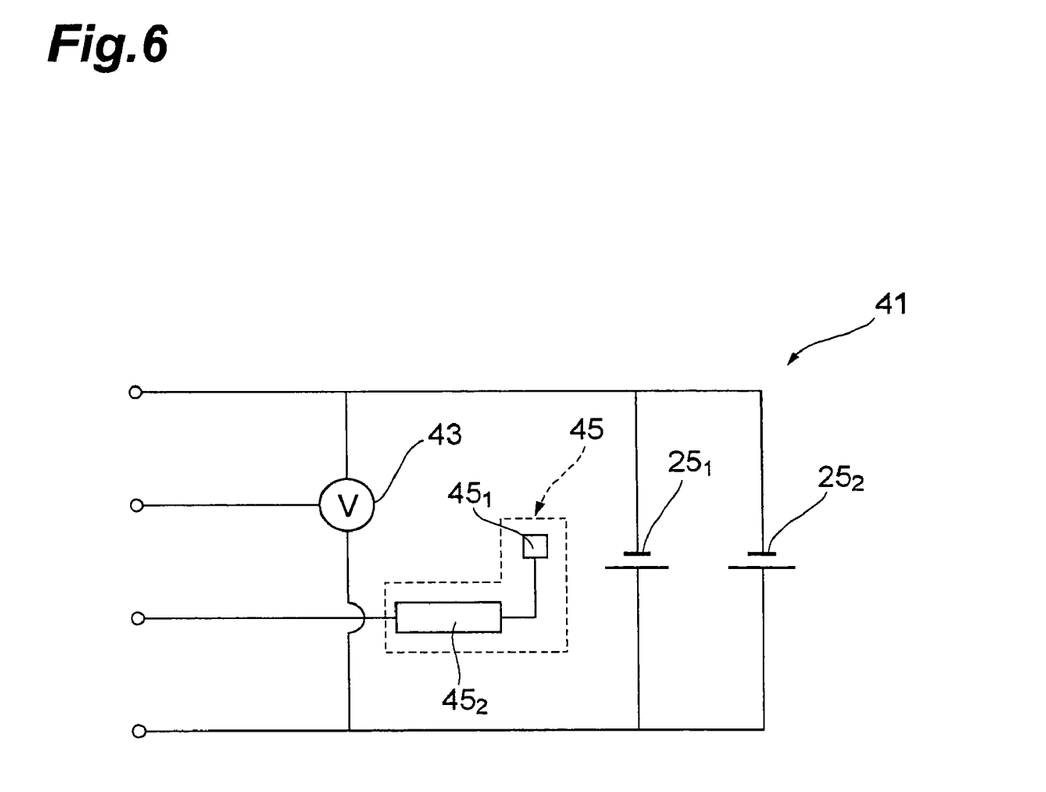
FIG. 6 is a schematic diagram illustrate the electronic circuit 41 of the electrochemical device 1B.

FIG. 6 is a schematic diagram illustrating the electronic circuit 41. As shown in FIG. 6, the electronic circuit 41 is composed of a voltage sensor component 43 and temperature sensor component 45. The voltage sensor component 43 senses the voltage of the electrochemical elements $25_1$ and $25_2$, and is connected in parallel between the electrode pad 5a and electrode pad 5b. The voltage sensor component 43 outputs the voltage sensed between the electrode pad 5a and electrode pad 5b to an output terminal.

The temperature sensor component 45 senses the temperature of the electrochemical device 1B which has the electrochemical elements $25_1$ and $25_2$, and has a temperature sensor (such as a thermistor) $45_1$ and an A/D converter $45_2$ by which the temperature sensing signal Vt output from the temperature sensor $45_1$ is converted to a digital signal Dt and is output.

Such a structure affords the same effects as the first embodiment, and also provides the following effects because the electrochemical device 13 is further equipped with an electronic circuit 41 composed of a voltage sensor component 43 and temperature sensor component 45 between the electrode pad 5a and electrode pad 5b. That is, the voltage sensor component 43 allows the voltage of the electrochemical elements $25_1$ and $25_2$ that are connected in parallel to be accurately sensed, so that the electrochemical elements $25_1$ and $25_2$ can be properly charged by an eternal circuit and the proper levels can be discharged from the electrochemical elements $25_1$ and $25_2$. That is, charging will be stopped when the sensed voltage is over a maximum level, and discharging will be stopped when the voltage is below a minimum level, allowing over-charging and over-discharging to be prevented. Additionally, the temperature sensor component 45 can accurately sense the temperature of the electrochemical device 1B, and the sensed level can be used as feedback in the form of a voltage control level when the battery is discharged so as to prevent rapid increases in substrate temperature, etc. That is, charging can be stopped when the sensed temperate is over a threshold to provide a fail safe function.

Figure 7:
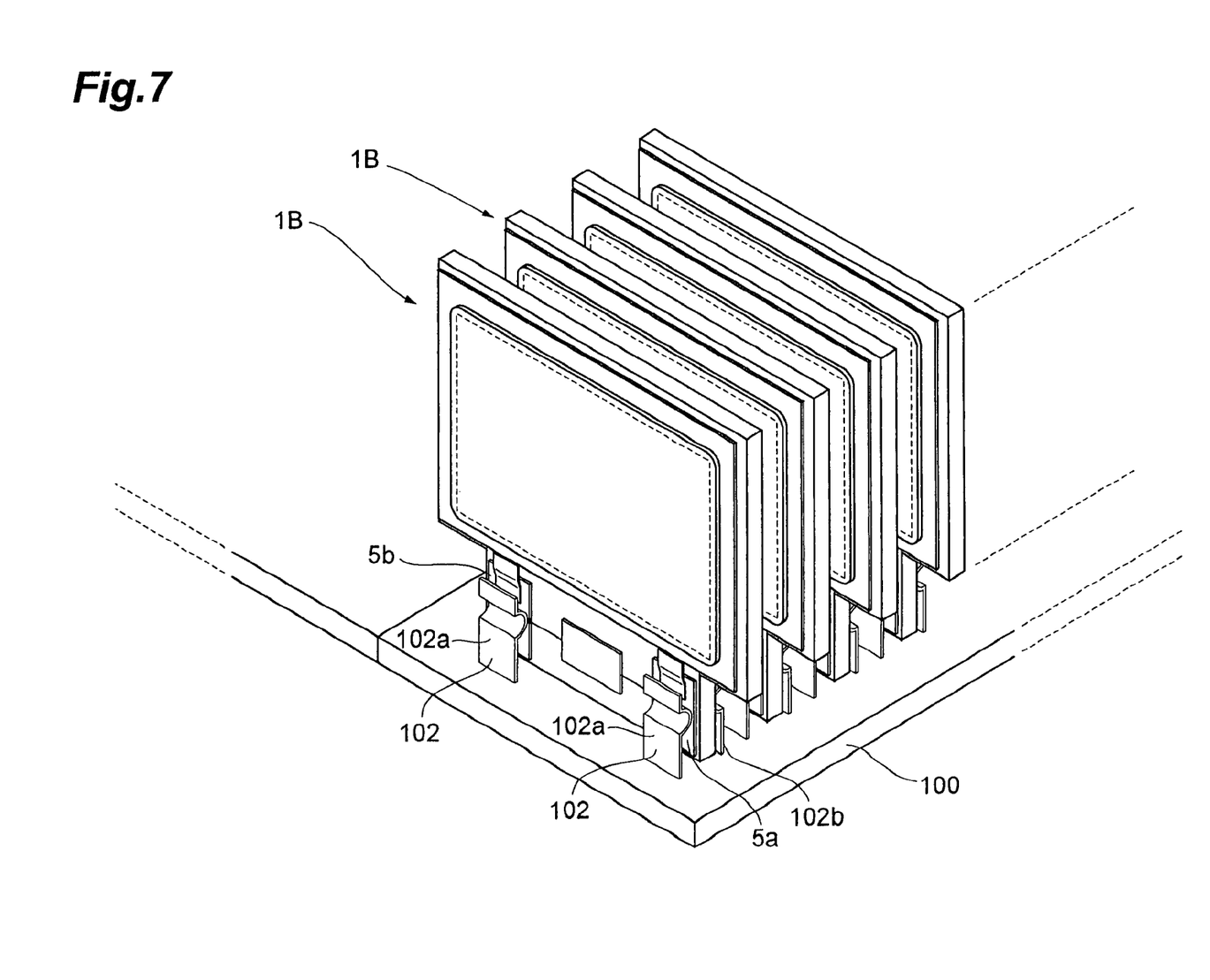
FIG. 7 illustrates an example of a specific method for using the electrochemical device 1B.

FIG. 7 illustrates an example of a specific method for using the electrochemical device 1B. In the same way as in the specific method for using the electrochemical device 1A in FIG. 4, a plurality of receiving female connectors 102 that project vertically relative to a substrate 100 are arranged in parallel on the substrate 100 in an object (such as electrical machinery or vehicle, etc.) equipped with the electrochemical device 1B, and the electrochemical device 1B, which has the electrochemical elements $25_1$ and $25_2$, is inserted into the receiving female connectors 102 using the protrusion 33 of the electrochemical device 1B as a connector. This allows a plurality of electrochemical devices 1B having an electronic circuit 41 to be vertically stacked in the direction in which the receiving female connectors 102 project upward. This allows the electrochemical devices 1B to be integrated while making efficient use of space. The plurality of stacked electrochemical devices 1B can also be connected in series to obtain high voltage.

The present invention is not limited to the above embodiments and is capable of a variety of modifications.

For example, in the first embodiment, the electrode pad 5a (first electrode pad) and the electrode pad 7a (first electrode pad) are electrically connected, and the electrode pad 5b (second electrode pad) and the electrode pad 7b (second electrode pad) are electrically connected, and the electrochemical elements $25_1$ and $25_2$ are connected in parallel. However, it is possible to not form a through-hole in one protrusion of an electrochemical device to enable the serial connection of the two corresponding electrochemical elements $25_1$ and $25_2$ in a single electrochemical device.

That is, the electrochemical elements $25_1$ and $25_2$ can be connected in series by connecting the electrode pad 5a (first electrode pad) and electrode pad 7b (second electrode pad) face-to-face or by connecting the electrode pad 5b (second electrode pad) and electrode pad 7a (first electrode pad) face-to-face. The conductive member 23b must be omitted when the electrode pad 5a (first electrode pad) and electrode pad 7b (second electrode pad) are connected and the conductive member 23a must be omitted when the electrode pad 5b (second electrode pad) and electrode pad 7a (first electrode pad) are connected. In this case, the receiving female connectors must have a structure for obtaining voltage form each of the two mutually facing electrode pads that are not connected by a conductive member.

Conductive members 23a and 23b were disposed in the through-holes 21a and 21b, respectively, and they were composed of rivets, but the conductive members 23a and 23b may also be composed of plated metal layers or soldering material, or the through-holes 21a and 21b may be filled with such materials. This will also allow the electrode pad 5a and the electrode pad 7a facing each other on opposite sides of the retaining substrate 3 to be electrically connected, and the electrode pad 5b and the electrode pad 7b facing each other on opposite sides of the substrate to be electrically connected.

In the second embodiment, an electronic circuit 41 was disposed between the electrode pads 5a and 5b on the upper surface of the protrusion 33, but it may also be disposed on the lower surface of the protrusion 33 or disposed on both the upper and lower surfaces. The electronic circuit 41 was also composed of a voltage sensor component 43 and a temperature sensor component 45, but may include other elements. For example, the electronic circuit 41 may be provided with a terminal (not shown) for transmitting signals from the voltage sensor component 43 and temperature sensor component 45 to an external device.

What is claimed is:
1. An electrochemical device, comprising:
   a plate-shaped substrate having:
      first and second terminal pads provided on one side of the plate-shaped substrate, and
      third and fourth terminal pads provided on the other side of the plate-shaped substrate;
   a first laminated electrochemical cell that is fixed to the one side of the plate-shaped substrate, the first laminated electrochemical cell having first and second foil electrode terminals; and
   a second laminated electrochemical cell that is fixed to the other side of the plate-shaped substrate, the second laminated electrochemical cell having third and fourth foil electrode terminals,
   wherein
   the first foil electrode terminal is electrically connected to the first terminal pad,
   the second foil electrode terminal is electrically connected to the second terminal pad,
   the third foil electrode terminal is electrically connected to the third terminal pad,
   the fourth foil electrode terminal is electrically connected to the fourth terminal pad, and
   the plate-shaped substrate is comprised of an insulator.
2. The electrochemical device according to claim 1,
   wherein the first terminal pad on the one side of the plate-shaped substrate faces the third terminal pad on the other side of the plate-shaped substrate,
   the second terminal pad on the one side of the plate-shaped substrate faces the fourth terminal pad on the other side of the plate-shaped substrate,
   the plate-shaped substrate has a through-hole passing through at least one set of pairs of the terminal pads with the plate-shaped substrate interposed therebetween, and
   a conductive member is disposed in the at least one through-hole.
3. The electrochemical device according to claim 2, wherein the conductive member is a rivet, plated metal layer, or solder material.

* * * * *